United States Patent
Nurmi

(10) Patent No.: US 10,684,763 B2
(45) Date of Patent: *Jun. 16, 2020

(54) MOBILE COMMUNICATIONS TERMINAL AND METHOD WITH AUTOMATIC RETURN TO A POSITION AFTER SCROLLING

(71) Applicant: Conversant Wireless Licensing S.a r.l., Luxembourg (LU)

(72) Inventor: Mikko A. Nurmi, Tampere (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 135 days.

This patent is subject to a terminal disclaimer.

(21) Appl. No.: 15/805,403

(22) Filed: Nov. 7, 2017

(65) Prior Publication Data

US 2018/0217746 A1    Aug. 2, 2018

Related U.S. Application Data

(63) Continuation of application No. 11/019,862, filed on Dec. 22, 2004, now Pat. No. 9,830,066.

(51) Int. Cl.
*G06F 3/0485*    (2013.01)
*G06F 3/0481*    (2013.01)

(52) U.S. Cl.
CPC ...... *G06F 3/04855* (2013.01); *G06F 3/04812* (2013.01)

(58) Field of Classification Search
None
See application file for complete search history.

(56) References Cited

U.S. PATENT DOCUMENTS

| | | | |
|---|---|---|---|
| 5,371,846 A | 12/1994 | Bates | |
| 5,506,951 A * | 4/1996 | Ishikawa | G06F 3/04855 715/777 |
| 5,510,808 A | 4/1996 | Cina et al. | |
| 5,550,969 A | 8/1996 | Torres et al. | |
| 5,864,330 A * | 1/1999 | Haynes | G06F 3/04855 715/856 |
| 5,950,216 A | 9/1999 | Amro et al. | |
| 5,973,663 A | 10/1999 | Bates et al. | |

(Continued)

FOREIGN PATENT DOCUMENTS

| | | |
|---|---|---|
| JP | 09-325879 | 12/1997 |
| JP | 2000293290 A | 10/2000 |
| WO | 99/26389 | 5/1999 |

OTHER PUBLICATIONS

European Office Action dated Mar. 24, 2011.
(Continued)

*Primary Examiner* — Christopher J Fibbi
(74) *Attorney, Agent, or Firm* — Conversant Wireless Licensing

(57) ABSTRACT

A method for controlling display of graphical information in a display window is presented. A scroll region, i.e. a scroll bar, is provided with a "memory" that indicates to the user where to return after scrolling away from a current position within, e.g., a large document. This is advantageous in that it relieves the user from having to be very attentive to the scrolling content of the window, which means that the scrolling can be performed more quickly when compared to prior art solutions.

19 Claims, 3 Drawing Sheets

(56) References Cited

U.S. PATENT DOCUMENTS

| | | |
|---|---|---|
| 5,987,482 A | 11/1999 | Bates et al. |
| 6,014,140 A | 1/2000 | Strand |
| 6,147,683 A * | 11/2000 | Martinez ............ G06F 3/04855 |
| | | 715/786 |
| 6,331,866 B1 | 12/2001 | Eisenberg |
| 6,677,965 B1 * | 1/2004 | Ullmann ............ G06F 3/04812 |
| | | 715/786 |
| 6,738,084 B1 | 5/2004 | Kelley et al. |
| 6,803,930 B1 | 10/2004 | Simonson |
| 6,940,532 B1 * | 9/2005 | Fukui ................. G06F 3/04855 |
| | | 715/784 |
| 9,830,066 B2 | 11/2017 | Mikko |
| 2005/0081164 A1 | 4/2005 | Hama et al. |
| 2005/0210403 A1 | 9/2005 | Satanek |

OTHER PUBLICATIONS

Russian Office Action dated Dec. 8, 2009.
"Notice of Reasons for Rejection" (English Translation), JP Application No. 2007-547687, dated May 12, 2009.
International Preliminary Report on Patentability dated Jul. 5, 2007.

* cited by examiner

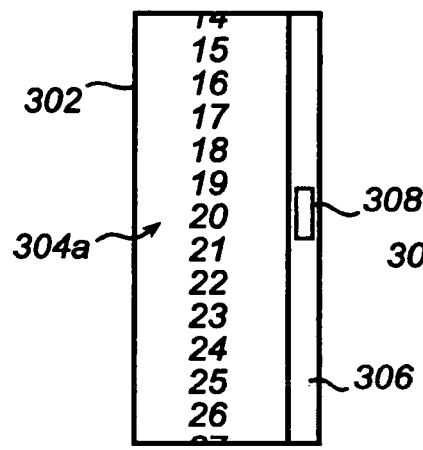 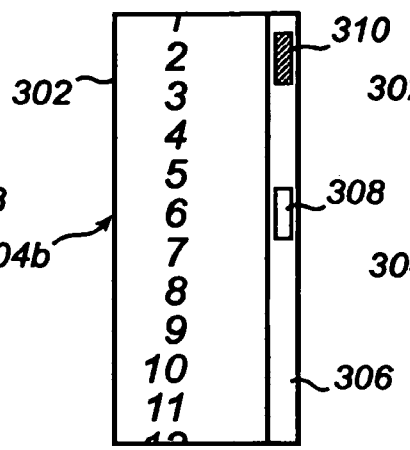 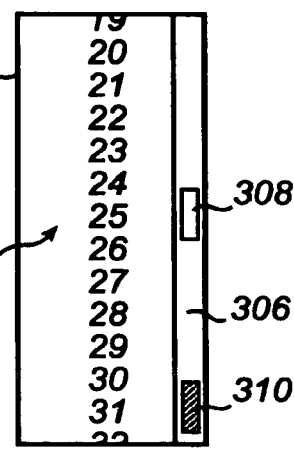
*Fig. 3a*  *Fig. 3b*  *Fig. 3c*
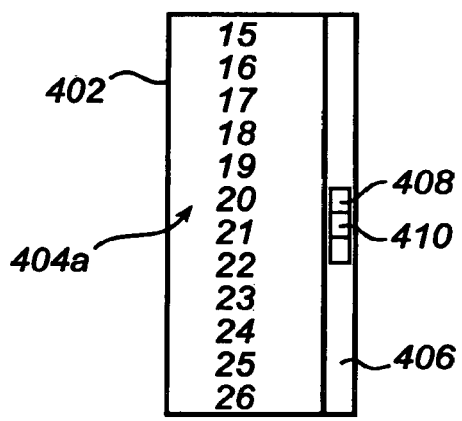 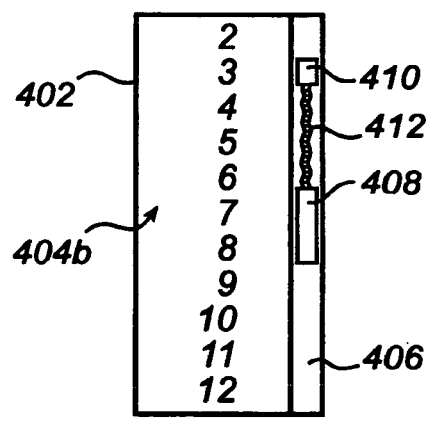
*Fig. 4a*  *Fig. 4b*

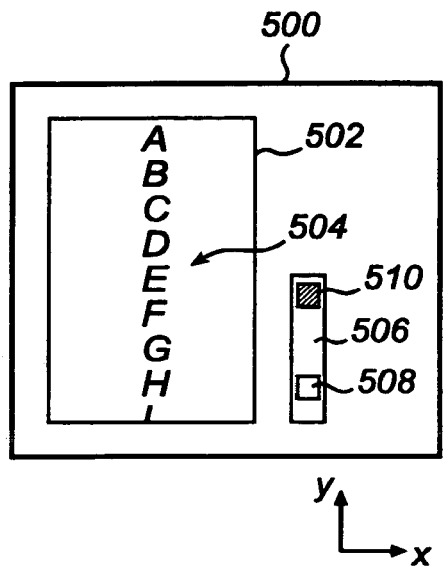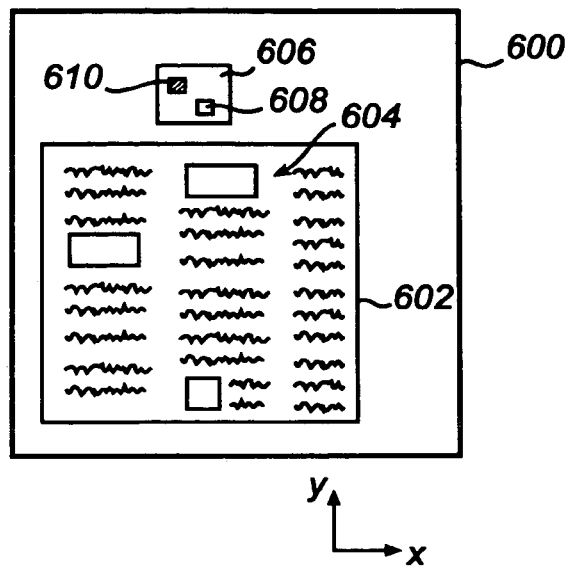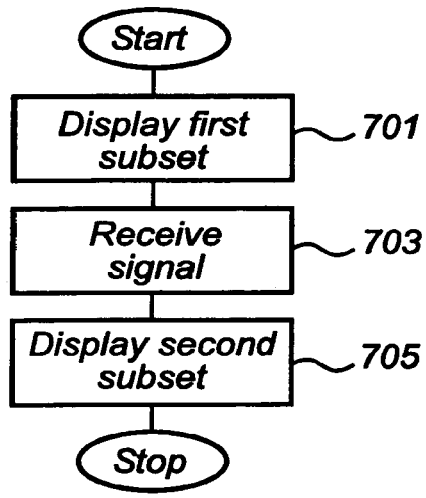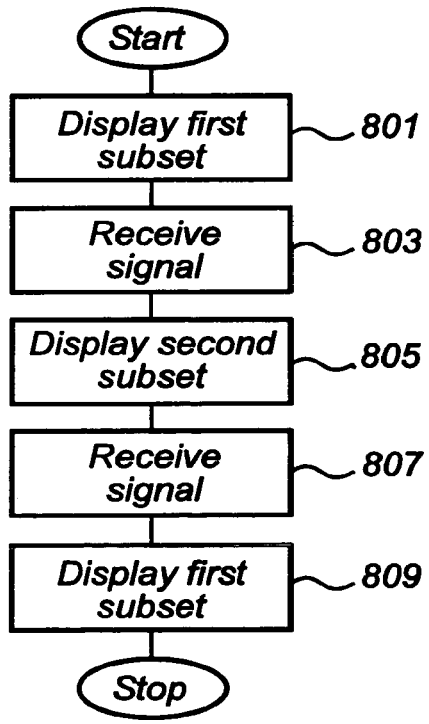
Fig. 5
Fig. 6
Fig. 7
Fig. 8

MOBILE COMMUNICATIONS TERMINAL AND METHOD WITH AUTOMATIC RETURN TO A POSITION AFTER SCROLLING

CROSS-REFERENCE TO RELATED APPLICATIONS

This application is a continuation of U.S. patent application Ser. No. 11/019,862 filed on Dec. 22, 2004. The above-identified application is herein incorporated by reference in its entirety.

BACKGROUND OF THE INVENTION

1. Field of the Invention

The present invention relates to displaying graphical information on a display device and in particular to controlling the display of different subsets graphical information.

2. Brief Description of Related Developments

Although the development of digital computing devices and storage devices during previous several decades has resulted in devices capable of very high speed processing and very large storage capacity, there still remain problems to solve with respect to interfacing with users of the devices. One example of such a problem is that of how to provide for a user to easily view large documents, such as a word processor or spread sheet document having hundreds of pages or a web page having thousands of lines of text and images. In particular, editing and browsing a large word processing document is usually very cumbersome when the user needs to refer to many different parts of the documents.

For example, while editing the document at a first position within the document the user may need to copy a paragraph of text from another part of the document. When performing this operation, the user will have to perform a first scrolling operation to scroll the document within a window on the display screen of the computer, thereby removing the current part of the document from a view, and then perform a copy or cut operation. This is then followed by a second scrolling operation in order to bring the current position into view again. When performing this second scrolling operation, the user will typically have to concentrate on studying the content of the scrolling window in order to recognize the position in the document, i.e. the current position, where to stop the scrolling operation. This is a problem at least in two aspects, since it requires the user to be very attentive to the scrolling content of the window, which also means that the scrolling may take an unnecessarily long time to perform.

State of the art solutions to this problem are very simple and hence do not compensate for the inconvenience of having to watch and study scrolling content in a display window. For example, word processors and spread sheet applications usually provide the user with a dynamic page number indicator that, during scrolling operations, display a numeral representing a page number or a line number.

SUMMARY OF THE INVENTION

An object of the present invention is hence to overcome the drawbacks of prior art solutions of controlling display of graphical information.

The object is achieved in a first aspect by way of a method of controlling display of graphical information in a window displayed on a display device. A first subset of the graphical information is displayed in the window and a scroll region is also displayed on the display device. Within the scroll region at least a first position indicator is displayed at a first position that is associated with a first position of the first subset of graphical information within the graphical information. The method comprises receiving a first signal being indicative of a user desiring to view a second subset of the graphical information. Further, the scroll region, a second position indicator at a second position that is associated with a second position of the second subset of graphical information within the graphical information.

In practice, this solution can be seen as providing the scroll region, i.e. a scroll bar, with a "memory" that indicates to the user where to return after scrolling away from a current position within, e.g., a large document. This is advantageous in that it relieves the user from having to be very attentive to the scrolling content of the window, which means that the scrolling can be performed more quickly when compared to prior art solutions.

In a preferred embodiment, the method according to the invention further comprises receiving a second signal being indicative of the user desiring to view the first subset of the graphical information, followed by displaying the first subset of the graphical information in the window, and erasing the second position indicator.

This provides the user with the option to signal the wish to automatically return to the view of the graphical content prior to the first scrolling. This has the advantage of further simplifying and speeding up scrolling of large documents.

In another preferred embodiment, the method according to the invention further comprises receiving a second signal being indicative of the user desiring to view the first subset of the graphical information, followed by displaying the first subset of said graphical information in the window and displaying, within the scroll region, the second position indicator at the first position.

This provides the user with an alternative option to signal the wish to automatically return to the view of the graphical content prior to the first scrolling. This has the advantage of further simplifying and speeding up scrolling of large documents.

BRIEF DESCRIPTION OF THE DRAWINGS

FIGS. 3a, 3b and 3c illustrate schematically the appearance of a window and a scroll region during performance of a method according to the present invention.

FIGS. 4a and 4b illustrate schematically the appearance of a window and a scroll region during performance of a method according to the present invention.

FIG. 5 illustrates schematically the appearance of a window and a scroll region.

FIG. 6 illustrates schematically the appearance of a window and a scroll region.

FIG. 7 is a flow chart of an embodiment of a method according to the present invention.

FIG. 8 is a flow chart of an embodiment of a method according to the present invention.

DETAILED DESCRIPTION OF THE PREFERRED EMBODIMENTS

Figure 1:
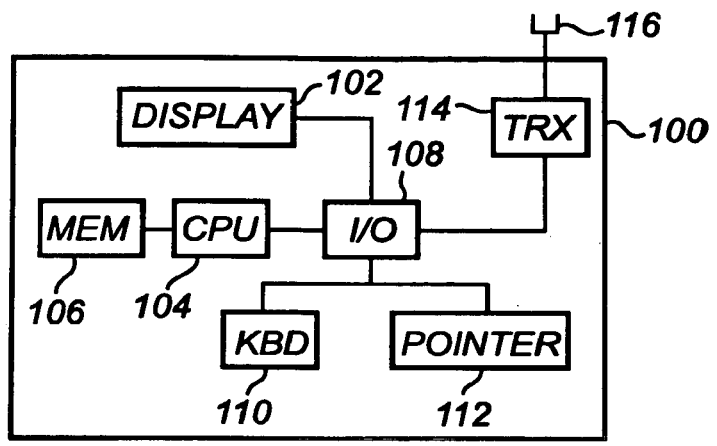
FIG. 1 illustrates schematically an arrangement according to the present invention.

A device in which the present invention is realized is schematically illustrated by way of a functional block diagram in FIG. 1.

A mobile telephone 100 comprises a display unit 102 on which graphical information may be displayed under the control of a control unit 104. The control unit 104 exchanges information in the form of program code and other data with a memory unit 106 and performs input/output operations with a keyboard 110, a pointing device 112 and a transceiver 114 equipped with an antenna 116 via an input/output unit 108.

Although FIG. 1 illustrates a mobile telephone 100 that is capable of processing data and displaying graphical information on its display, other computer devices may be utilized in realizing the present invention. One example of such a device is a personal computer, more or less stationary or portable, which comprises a display device, keyboard and a pointing device capable of providing signals to the computer that indicate a user's desire to move a graphical pointer on the display and to provide other signals via buttons on the pointing device. As the skilled person will realize, a pointing device may be in the form of a conventional mouse, joystick, touch pad etc. Control software, residing in the memory unit 106, is designed according to the invention to control displaying of graphical information on the display unit 102.

Figure 2:
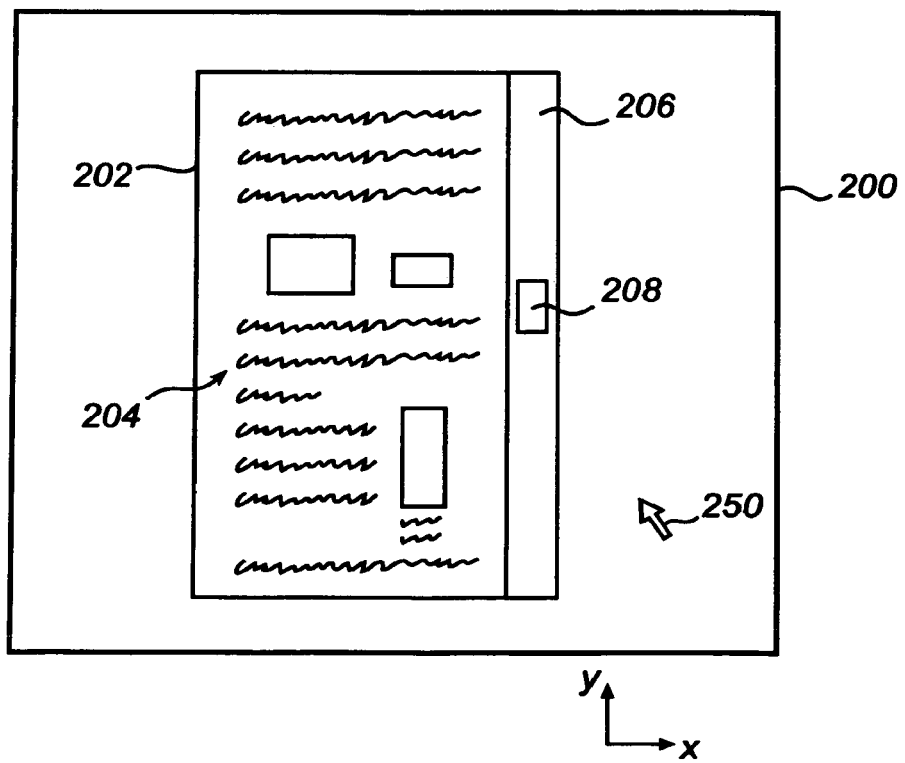
FIG. 2 illustrates schematically a display device on which graphical information is displayed in a window along with a scroll region.

FIG. 2 is a schematically illustrated display device 200 such as the display device 102 of the arrangement in FIG. 1. A rectangular window 202, extending in a horizontal direction x and a vertical direction y, shows a subset of graphical information 204, which in this case is in the form of text and images. As the skilled person will realize, the graphical information 204 may originate from a web server, in which case the window 202 forms part of a web browser. The graphical information 204 may also be a word processor document or a spread sheet document or any other kind of document that is viewable by means of a viewer having a window 202.

Along the whole vertical extent of the window 202 is a scroll region 206 displayed. Such a scroll region is often denoted scroll bar. In the scroll region 206 is a position indicator 208 displayed. The position indicator 208 is positioned, in the vertical direction y, within the scroll region 206 such that it represents a position of the subset of graphical information 204 within the graphical information that constitute the web page or document that is displayed in the window 202.

The position indicator 208 is also a visual representation of an interactive tool, i.e. a function within the controlling display software, that a user/viewer manipulates to instruct the control software to display any subset of graphical information of the document displayed in the window 202. Such manipulation is typically executed by means of signals from a pointing device, such as the pointing device 112 discussed above in connection with FIG. 1. As the skilled person will realize, the pointing device is often represented graphically on the display 200, for example by an arrow 250.

Turning now to FIGS. 3a-c, in which an embodiment of the present invention is illustrated. FIGS. 3a-c show a window 302 in which graphical information 304a, 304b, 304c is illustrated by a sequence of numbers 1 to 32. Alongside the window 302 is a scroll region 306 with a position indicator 308.

FIG. 3a illustrates a situation in which a first subset of graphical information 304a (here represented by the number interval 15 to 26), located roughly at a midpoint within the graphical information, is displayed in the window 302. The position indicator 308 is in FIG. 3a located at a position roughly in the middle of the scroll region 306.

FIG. 3b illustrates the appearance of the window 302 subsequent to a scrolling operation, which has been initiated by a user/viewer by way of manipulation of a pointing device, as discussed above in connection with FIG. 2. A signal has been received, by the software that controls the display window 302, to display a second subset of graphical information 304b (here represented by the number interval 2 to 11) located roughly at the beginning of the graphical information. A second position indicator 310 has now appeared, as a response to the signal received from the pointing device and under control of the display software. The second position indicator is located at a position roughly at the top of the scroll region 306. The position indicator 308 in FIG. 3a remains located at a position roughly in the middle of the scroll region 306, thereby acting as "a reminder" for the user/viewer which subset of graphical information, i.e. subset 304a, was displayed prior to the manipulation of the pointing device.

FIG. 3c illustrates a situation similar to that in FIG. 3b. That is, FIG. 3c illustrates the appearance of the window 302 subsequent to a scrolling operation, which has been initiated by a user/viewer by way of manipulation of a pointing device, as discussed above in connection with FIG. 2. A signal has been received, by the software that controls the display window 302, to display yet a second subset of graphical information 304c (here represented by the number interval 20 to 31) located roughly at the end of the graphical information. Yet a second position indicator 310 has now appeared, as a response to the signal received from the pointing device and under control of the display software. The second position indicator is in FIG. 3c located at a position roughly at the bottom of the scroll region 306. As was the case in the situation described in connection with FIG. 3b, the position indicator 308 in FIG. 3c remains located at a position roughly in the middle of the scroll region 306, thereby acting as "a reminder" for the user/viewer which subset of graphical information, i.e. subset 304a, was displayed prior to the manipulation of the pointing device.

Optionally, subsequent to any of the situations described with reference to FIGS. 3b and 3c, a second signal may be received from the pointing device in response to a user/viewer's desire to return to the view of the graphical information as shown in FIG. 3a. Such a signal indicates to the display software that the second position indicator 310 is to be erased, while the position indicator 308 remains displayed in the scroll region 306, and that the subset of graphical information 304a is to be displayed in the window 302.

From a user viewpoint, the embodiment described with reference to FIGS. 3a-c may be summarized as follows. The user is browsing a page of content on a web site, where the content of the page comprises large sections of text as well as pictures. The content of the web page extends well above and below of the display window in which the web page is displayed. While reading at a current position, the user realizes that he/she needs to look at a particular section of the web page that is way out of view, above or below the current view in the display window. The user then clicks a mouse button, e.g. double-clicking the rightmost button on a two-button mouse, while pointing at the scroll bar at the position of the current position indicator. A "reminder" is then created and displayed in the form of a copy of the current position indicator, e.g. displayed in a different color, at the same position as the current position indicator. The user then scrolls the display window to the particular section of the web page that contains the content that the user wishes to view before continuing to view at the current position. After viewing the particular section of the web page, the user decides to return to viewing at the current position. To effectuate this, the user again clicks a mouse button, e.g. double-clicking the right most button on a two-button mouse, while pointing at the scroll bar at the position of the "reminder" position indicator. The view in the display window then returns to the current position and the "reminder" position indicator is erased. Alternatively, to effectuate the return of view to the current position, the user may click the mouse button while pointing at the scroll bar at the position of the current position indicator.

Another embodiment of a method according to the present invention is illustrated in FIGS. 4a and 4b. Similar to the embodiment described with reference to FIGS. 3a-c, a window 402 displays subsets of graphical information 404a and 404b in respective FIGS. 4a and 4b. The graphical information is, as previously, schematically represented by a sequence of numbers 1 to 32. Adjacent to the window 402 is a scroll region 406 with a first position indicator 408 located at a position corresponding to the position of the respective subset of graphical information within the graphical information.

FIG. 4a illustrates a situation in which a first subset of graphical information 404a (here represented by the number interval 15 to 26), located roughly at a midpoint within the graphical information, is displayed in the window 402. The first position indicator 408 is in FIG. 4a located at a position roughly in the middle of the scroll region 406. A second position indicator 410 is also displayed in the scroll region 406.

FIG. 4b illustrates the appearance of the window 402 subsequent to a scrolling operation, which has been initiated by a user/viewer by way of manipulation of a pointing device, as discussed above in connection with FIG. 2. A signal has been received, by the software that controls the display window 402, to display a second subset of graphical information 404b (here represented by the number interval 2 to 12) located roughly at the beginning of the graphical information. The second position indicator 410 is located at a position roughly at the top of the scroll region 406. The first position indicator 408 remains located at a position roughly in the middle of the scroll region 406, thereby acting as "a reminder" for the user/viewer which subset of graphical information, i.e. subset 404a, was displayed prior to the manipulation of the pointing device.

Preferably, the signal received from the pointing device, indicating the change of display of the graphical information, is one that has been generated by the user performing a so-called "click and drag" action using, e.g. a "click"-button pointing device in the form of a computer mouse. During the so-called "click and drag" action the display of graphical information changes into that of FIG. 4b, where a second subset of graphical information 404b is displayed (cf. the situation described in connection with FIG. 3b). Moreover, a visual representation of a resilient spring 412 has now appeared in the scroll region 406 to indicate to the user/viewer that, when releasing the "click"-button, the control software will receive a signal indicating that the window 402 is to again display the first subset of graphical information 404a in the window 402 and to "return" the second position indicator 410 to its previous position in the scroll region 406.

From a user viewpoint, the embodiment described with reference to FIGS. 4a and 4b may be summarized as follows. The user is browsing a page of content on a web site, where the content of the page comprises large sections of text as well as pictures. The content of the web page, extends well above and below of the display window in which the web page is displayed. While reading at a current position, the user realizes that he/she needs to look at a particular section of the web page that is way out of view, above or below the current view in the display window. The user then uses a mouse button in a click-and-drag action, e.g. using the rightmost button on a two-button mouse, to drag a temporary position indicator to the particular section that contains the content that the user wishes to view. That is, when starting the click-and-drag action, a temporary position is created and displayed in the form of, e.g., a copy of the current position indicator. During the click-and-drag action, a visual representation of a resilient spring joining the temporary position indicator that is being dragged and the current position indicator is displayed. During viewing at the particular section, the user keeps the mouse button pressed. After viewing the particular section of the web page, the user decides to return to viewing at the current position. To effectuate this, the user simply releases the mouse button used during the click-and-drag action. The view in the display window then returns to the current position and the resilient spring and the temporary position indicator disappear.

Turning now to FIGS. 5 and 6, other alternative embodiments of the invention will be briefly discussed. Hence, FIG. 5 shows a display device 500 on which a window 502 is displayed. In the window 502 a subset of graphical information 504 is displayed. A scroll region 506 is shown near the window 502. In contrast to the previous embodiments described above, the scroll region 506 is in FIG. 5 neither positioned directly adjacent to the window 502 nor does it have the same spatial extent in the y-direction as the window 502. By receiving and responding to signals from a pointing device, e.g. pointing device 112 in the device of FIG. 1, display control software performs to change the appearance of the window 502, the scroll region 506, a position indicator 508 and a second position indicator 510 as described above.

Continuing with yet another embodiment of the invention, FIG. 6 illustrates a display 600 on which a window 602 displays a subset of graphical information 604. In this embodiment, a scroll region 606 is illustrated as having a two-dimensional spatial extent, i.e. in contrast to the previous embodiments, the scroll region 606 extends in the x-direction as well as in the y-direction. Moreover, a position indicator 608 and a second position indicator 610 are illustrated within the scroll region 606. By receiving and responding to signals from a pointing device, e.g. pointing device 112 in the device of FIG. 1, display control software performs to change the appearance of the window 602, the scroll region 606, the position indicator 608 and the second position indicator 610 as described above, with the difference being that the positions may vary in both the x-direction and the y-direction.

A method according to another preferred embodiment of the present invention will now be described with reference to a flow chart in FIG. 7 and with reference also to the description above of FIG. 1 and FIGS. 3a and 3b. The method is preferably realized by way of a computer program residing in the memory unit 106 of the device 100.

In a first step 701, the first subset of graphical information 304a is displayed in the window 302 and the first position indicator 308 is displayed at the first position within the scroll region 306.

In a second step 703 the first signal is received, where the signal is indicative of a user/viewer desiring to view the second subset 304b of the graphical information.

In a third step 705, the second subset of graphical information 304b is displayed in the window 302 on the display 300 and the second position indicator 310 is displayed at the second position within a scroll region 306.

A method according to another preferred embodiment of the present invention will now be described with reference to a flow chart in FIG. 8 and with reference also to the description above of FIG. 1 and FIGS. 4a and 4b. The method is preferably realized by way of a computer program residing in the memory unit 106 of the device 100.

In a first step 801, the first subset of graphical information 494a is displayed in the window 402 and the first and second position indicators 408 and 410 are displayed at the first position within the scroll region 406.

In a second step 803 the first signal is received, where the signal is indicative of a user/viewer desiring to view the second subset 404b of the graphical information.

In a third step 805, the second subset of graphical information 404b is displayed in the window 302 on the display 300 and the second position indicator 410 is displayed at the second position within a scroll region 406. Displayed between the first position indicator 408 and the second position indicator 410 is a visual representation of a resilient spring 412.

In a fourth step 807 the second signal is received, where the signal is indicative of a user/viewer desiring to again view the first subset 404a of the graphical information.

In a fifth step 809, the first subset of graphical information 404a is again displayed in the window 402 and the first and second position indicators 408 and 410 are again displayed at the first position within the scroll region 406. The visual representation of the resilient spring 412 is erased.

The invention claimed is:

1. A method comprising:
    displaying a first subset of graphical information within a display window on a display;
    displaying a first position indicator in a scroll region on the display, at a first position corresponding to the first subset of graphical information within the graphical information;
    responsive to a user action, displaying a second subset of graphical information within the display window and moving a second position indicator in both of two dimensions within the scroll region from the first position to a second position corresponding to a second subset of graphical information within the graphical information;
    during the displaying of the second subset of graphical information, displaying both the first position indicator and the second position indicator within the scroll region; and
    responsive to ending of the user action, displaying the first subset of graphical information within the display window and causing the second position indicator to return to the first position in the scroll region or disappear from display.

2. The method of claim 1, further comprising:
    during the displaying of the first subset of graphical information, displaying the second position indicator at the position of the first position indicator.

3. The method of claim 1, further comprising:
    displaying a visual representation linking the first and second position indicators during the moving of the second position indicator;
    wherein the visual representation is displayed within the scroll region and indicates to a user that, when the user action ends, the first subset of graphical information will again be displayed.

4. The method of claim 1, wherein the user action comprises initiation of a click and drag action;
    and wherein ending the user action comprises release of the click and drag action.

5. The method of claim 1, wherein the user action comprises a first user manipulation of a pointing device;
    and wherein the ending of the user action comprises a second user manipulation of the pointing device.

6. The method of claim 1, wherein the scroll region has different spatial extent, in two dimensions, from that of the display window.

7. The method of claim 1, wherein the first and the second subsets of the graphical information are located in a single document.

8. The method of claim 1, further comprising:
    responsive to a user action of a type different from the user action to which the moving of the second position indicator is responsive, displaying the second position indicator in the scroll region of the display.

9. The method of claim 8, wherein the displaying of the second position indicator is performed prior to displaying the second subset of graphical information and moving the second position indicator responsive to the user action.

10. An apparatus comprising:
    a controller; and
    a memory including computer program code that, when executed by the controller, causes the apparatus to perform a plurality of operations comprising:
        display a first subset of graphical information within a display window on a display;
        display a first position indicator in a scroll region on the display, at a first position corresponding to the first subset of graphical information within the graphical information;
        responsive to a user action, display a second subset of graphical information within the display window and move a second position indicator in both of two dimensions within the scroll region from the first position to a second position corresponding to a second subset of graphical information within the graphical information;
        during the displaying of the second subset of graphical information, display both the first position indicator and the second position indicator within the scroll region; and
        responsive to ending of the user action, display the first subset of graphical information within the display window and causing the second position indicator to return to the first position in the scroll region or disappear from display.

11. The apparatus of claim 10, further comprising:
    a display;
    wherein the displaying operations display the first and second subset of graphical information, and the first and second position indicators in the scroll region, on the display of the apparatus itself.

12. The apparatus of claim 10, wherein the plurality of operations further comprises:
    during the displaying of the first subset of graphical information, displaying the second position indicator at the position of the first position indicator.

13. The apparatus of claim 10, wherein the plurality of operations further comprises:
    displaying a visual representation linking the first and second position indicators during the moving of the second position indicator;

wherein the visual representation is displayed within the scroll region and indicates to a user that, when the user action ends, the first subset of graphical information will again be displayed.

14. The apparatus of claim 10, further comprising:
a pointing device;
wherein the user action comprises initiation of a click and drag action of the pointing device;
and wherein ending the user action comprises release of the click and drag action of the pointing device.

15. The apparatus of claim 10, further comprising:
a pointing device;
wherein the user action comprises a first user manipulation of the pointing device;
and wherein the ending of the user action comprises a second user manipulation of the pointing device.

16. The apparatus of claim 10, wherein the scroll region has different spatial extent, in two dimensions, from that of the display window.

17. The apparatus of claim 10, wherein the first and the second subsets of the graphical information are located in a single document.

18. The apparatus of claim 10, wherein the plurality of operations further comprises:
responsive to a user action of a type different from the user action to which the moving of the second position indicator is responsive, displaying the second position indicator in the scroll region of the display.

19. The apparatus of claim 18, wherein the displaying of the second position indicator is performed prior to displaying the second subset of graphical information and moving the second position indicator responsive to the user action.

\* \* \* \* \*